(12) United States Patent
Park et al.

(10) Patent No.: US 10,911,734 B2
(45) Date of Patent: Feb. 2, 2021

(54) DISPLAY DEVICE FOR PERSONAL IMMERSIVE DEVICE

(71) Applicant: LG Display Co., Ltd., Seoul (KR)

(72) Inventors: Choonho Park, Paju-si (KR); Sangsoo Kim, Paju-si (KR); Dohyung Kim, Paju-si (KR); Sehwan Na, Paju-si (KR); Sohyun Kim, Goyang-si (KR); Kyoungjune Jung, Pocheon-si (KR); Jinwoo Park, Goyang-si (KR); Jaeyoung Lee, Seoul (KR); Inyoung Jeon, Busan (KR); Mijung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 394 days.

(21) Appl. No.: 15/371,150

(22) Filed: Dec. 6, 2016

(65) Prior Publication Data
US 2017/0188006 A1 Jun. 29, 2017

(30) Foreign Application Priority Data

Dec. 28, 2015 (KR) .................. 10-2015-0187537

(51) Int. Cl.
*H04N 13/144* (2018.01)
*H04N 13/344* (2018.01)
(Continued)

(52) U.S. Cl.
CPC ......... *H04N 13/144* (2018.05); *G09G 3/3233* (2013.01); *G09G 3/3266* (2013.01);
(Continued)

(58) Field of Classification Search
None
See application file for complete search history.

(56) References Cited

U.S. PATENT DOCUMENTS

| 2005/0116656 | A1* | 6/2005 | Shin | ..................... G09G 3/3233 |
|---|---|---|---|---|
| | | | | 315/169.3 |
| 2005/0116903 | A1 | 6/2005 | Shin | |

(Continued)

FOREIGN PATENT DOCUMENTS

| CN | 105093532 A | 11/2015 |
|---|---|---|
| CN | 105120253 A | 12/2015 |

(Continued)

OTHER PUBLICATIONS

Taiwan Office Action, Taiwan Application No. 105143009, dated Nov. 14, 2017, 12 pages.

(Continued)

*Primary Examiner* — Brian M Butcher
(74) *Attorney, Agent, or Firm* — Fenwick & West LLP

(57) ABSTRACT

A virtual reality display device that can include a first pixel array and a second pixel array. Pixels of the pixel arrays can have a response time that is less than 2 msec, where the response time for a pixel is a sum of a first amount of time for brightness of the pixel to rise from 10% of white luminance to 90% of white luminance and a second amount of time for response time to fall from 90% of white luminance to 10% of white luminance. Additionally, the first pixel array can be separated from the second pixel array by a gap, and a distance from a center of the first pixel array to a center of the second pixel array is between 58 mm to 72 mm.

16 Claims, 12 Drawing Sheets

(51) Int. Cl.
*G09G 3/3233* (2016.01)
*G09G 3/3266* (2016.01)
*G09G 3/3283* (2016.01)
*G09G 3/36* (2006.01)

(52) U.S. Cl.
CPC ......... *G09G 3/3283* (2013.01); *H04N 13/344* (2018.05); *G09G 3/3659* (2013.01); *G09G 2300/043* (2013.01); *G09G 2300/0465* (2013.01); *G09G 2300/0819* (2013.01); *G09G 2300/0861* (2013.01); *G09G 2320/0247* (2013.01); *G09G 2320/0252* (2013.01); *G09G 2354/00* (2013.01); *H04N 2213/002* (2013.01)

(56) References Cited

U.S. PATENT DOCUMENTS

| | | | | |
|---|---|---|---|---|
| 2011/0050870 | A1* | 3/2011 | Hanari | G09G 3/3233 348/56 |
| 2012/0069296 | A1 | 3/2012 | Li et al. | |
| 2012/0274556 | A1* | 11/2012 | Sugiyama | G02B 27/2214 345/156 |
| 2014/0139510 | A1 | 5/2014 | Han et al. | |
| 2014/0198193 | A1* | 7/2014 | Yamamoto | G09G 3/003 348/54 |
| 2015/0243220 | A1 | 8/2015 | Kim et al. | |
| 2016/0079333 | A1* | 3/2016 | Shishido | H01L 27/3218 257/72 |
| 2017/0214905 | A1 | 7/2017 | Wu | |
| 2017/0251199 | A1 | 8/2017 | Zhang et al. | |

FOREIGN PATENT DOCUMENTS

| | | |
|---|---|---|
| EP | 1429312 A2 | 6/2004 |
| EP | 2736039 A2 | 5/2014 |
| WO | WO 2013/027380 A1 | 2/2013 |

OTHER PUBLICATIONS

European Partial Search Report, European Application No. 16204984.5, dated May 4, 2017, 13 pages.

European Patent Office, Communication pursuant to Article 94(3) EPC, EP Patent Application No. 16204984.5, dated May 20, 2020, six pages.

* cited by examiner (a)

(b)

DISPLAY DEVICE FOR PERSONAL IMMERSIVE DEVICE

CROSS REFERENCE TO RELATED APPLICATIONS

This application claims the benefit of Korean Patent Application No. 10-2015-0187537 filed on Dec. 28, 2015, the entire contents of which is incorporated herein by reference for all purposes as if fully set forth herein.

BACKGROUND OF THE INVENTION

Field of the Invention

The present disclosure relates to a display device for a personal immersive device implementing virtual reality.

Discussion of the Related Art

Virtual reality technology has been applied to a defense field, an architecture field, a tourist field, a film field, a multimedia field, a game field, and the like. Virtual reality means a specific environment or a specific situation allowing a user to feel as a real environment using a stereoscopic image technology.

The virtual reality technology has been applied to personal immersive devices, so as to maximize the immersion of the virtual reality. Examples of the personal immersive device include a head mounted display (HMD), a face mounted display (FMD), and an eye glasses-type display (EGD).

A performance of the personal immersive device was not as satisfactory as expected in terms of a stereoscopic feeling, an immersion, and a fatigue of a stereoscopic image, etc. as well as an uncomfortable appearance design. A method for displaying a stereoscopic image on a smart phone and installing the smart phone in the HMD a user wears has been recently developed, so as to implement virtual reality on a display device of the smart phone. However, because an optimum design of virtual reality is not applied to the display device of the smart phone, a method for displaying a virtual reality image using the smart phone cannot implement high-quality virtual reality.

SUMMARY OF THE INVENTION

The present disclosure provides a display device for a personal immersive device capable of improving a stereoscopic feeling, an immersion, and a fatigue.

In one embodiment, a virtual reality display device comprises a first pixel array. The pixels of the first pixel array have a response time that is less than 2 msec, where the response time for a pixel is a sum of a first amount of time for brightness of the pixel to rise from 10% of white luminance to 90% of white luminance and a second amount of time for response time to fall from 90% of white luminance to 10% of white luminance.

In one embodiment, the display device comprises a second pixel array separated from the first pixel array by a gap. A distance from a center of the first pixel array to a center of the second pixel array is between 58 mm to 72 mm. In one embodiment, the first pixel array is adjacent to the second pixel array along a first direction. The first pixel array has a landscape aspect ratio such that a length of the first pixel array in the first direction is longer than a length of the first pixel array in a second direction perpendicular to the first direction. The second pixel array also has a landscape aspect ratio such that a length of the second pixel array in the first direction is longer than a length of the second pixel array in the second direction.

In one embodiment, a first data driver IC provides data voltages to first data lines coupled to the first pixel array. A second data driver IC provides data voltages to second data lines coupled to the second pixel array.

In one embodiment, a first gate driver provides scan signals to first gate lines coupled to the first pixel array. A second gate driver provides scan signals to second gate lines coupled to the second pixel array. Additionally, the first gate driver and the second gate driver are located between the first pixel array and the second pixel array.

In one embodiment, the pixels of the first pixel array and second pixel array comprise metal oxide semiconductor field effect transistors (MOSFET). In one embodiment, the first pixel array and the second pixel array each have a resolution equal to or greater than 1440×1280, a pixel density equal to or greater than 500 ppi (pixels per inch), and a pixel aperture ratio equal to or greater than 14%.

In one embodiment, the pixels comprise a first pixel coupled to a first emission line and a first scan line. The display device further comprises a driver circuit to provide, during a frame period, a first scan signal to the first scan line at a first voltage level to scan a first data voltage into the first pixel. The driver circuit also provides, during the frame period and while the first scan signal has a second voltage level, a first emission signal having a duty ratio that is less than or equal to 50% to the first emission line, light emission of the first pixel being switched on and off based on a state of the first emission signal.

In one embodiment, the first pixel comprises a light emitting element to emit light in accordance with current flowing through the light emitting element; a storage capacitor; a scan transistor to supply the data voltage to the storage capacitor, the scan transistor having a gate connected to the first scan line; a drive transistor to control a level of the current flowing through the light emitting element in accordance with the data voltage; and a switching transistor to switch the first current on and off in response to the state of the first emission signal.

In one embodiment, the pixel array comprises a second pixel coupled to a second emission line and a second scan line. The driver circuit also provides, during the frame period, a second scan signal to the second scan line at the first voltage level to scan the data voltage into the second pixel; and provides, during the frame period and while the second scan signal has the second voltage level, a second emission signal to the second emission line. The second emission signal has a duty ratio that is less than or equal to 50% and has a different phase than the first emission signal. Light emission of the second pixel is switched on and off based on a state of the second emission signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
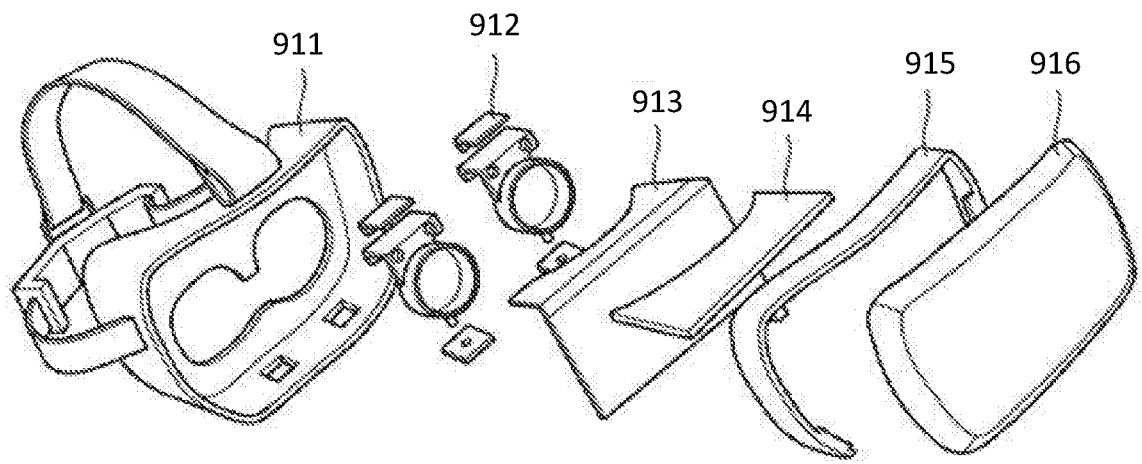
FIG. 1 is an exploded perspective view showing a personal immersive device according to an exemplary embodiment of the invention.

Referring to FIG. 1, a personal immersive device according to an exemplary embodiment of the invention includes a lens module 912, a display module 913, a main board 914, a headgear 911, a side frame 915, a front cover 916, and the like.

The display module 913 includes a display panel driving circuit for driving each of two display panels and displays an input image received from the main board 914. The display panels include a first display panel a user watches with his or her left eye and a second display panel the user watches with his/her right eye. The display module 913 displays image data received from the main board 914 on the display panels. The image data may be two-dimensional (2D) or three-dimensional (3D) image data implementing virtual reality (VR) video images or augmented reality (AR) video images. The display module 913 may display various information received from the main board 914 as texts, symbols, etc.

The lens module 912 includes super-wide-angle lenses (i.e., a pair of fisheye lenses) for widening an angle of view between the user's left and right eyes. The pair of fisheye lenses includes a left eye lens disposed in front of the first display panel and a right eye lens disposed in front of the second display panel.

The main board 914 includes a processor that executes virtual reality software and supplies a left eye image and a right eye image to the display module 913. The main board 914 further includes an interface module connected to an external device, a sensor module, and the like. The interface module is connected to the external device through an interface such as universal serial bus (USB) and high definition multimedia interface (HDMI). The sensor module includes a gyro sensor, an acceleration sensor, and the like.

The processor of the main board 914 corrects left eye image data and right eye image data in response to an output signal of the sensor module and transmits left eye image data and right eye image data of an input image received through the interface module to the display module 913. The processor of the main board 914 may produce a left eye image and a right eye image suitable for a resolution of the display panel based on the result of an analysis of depth information of a 2D image and may transmit the left eye image and the right eye image to the display module 913.

The headgear 911 includes a back cover exposing the fisheye lenses and a band connected to the back cover. The back cover of the headgear 911, the side frame 915, and the front cover 916 are assembled to secure an inner space, in which components of the personal immersive device are disposed, and to protect the components. The components include the lens module 912, the display module 913, and the main board 914. The band is connected to the back cover. The user wears the personal immersive device on his/her head using the band. When the user wears the personal immersive device on his/her head, he/she watches the different display panels (i.e., the first and second display panels) with his/her left and light eyes through the fisheye lenses.

The side frame 915 is fixed between the headgear 911 and the front cover 916 and secures a gap of the inner space, in which the lens module 912, the display module 913, and the main board 914 are disposed. The front cover 916 is disposed at a front surface of the personal immersive device.

The personal immersive device according to the embodiment of the invention may be implemented as a head mounted display (HMD) shown in FIG. 1, but is not limited to FIG. 1. For example, the embodiment of the invention may be implemented as an eye glasses-type display (EGD).

Figure 2:
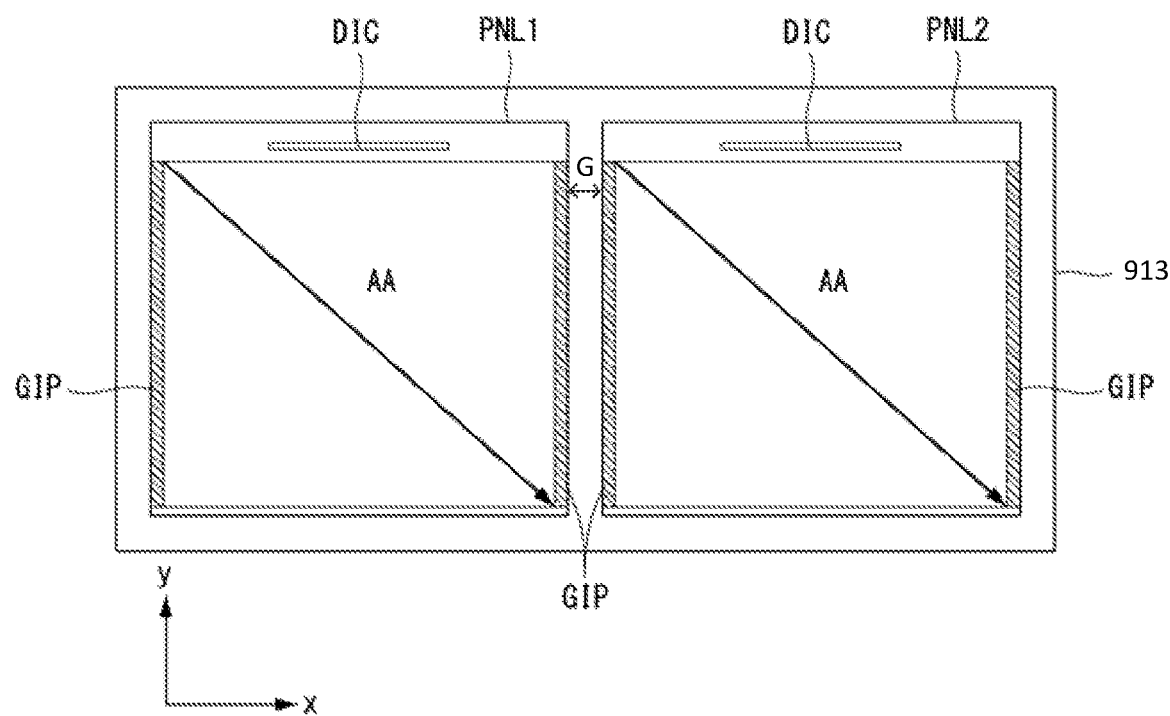
FIG. 2 shows first and second display panels of a display module shown in FIG. 1.
Figure 3:
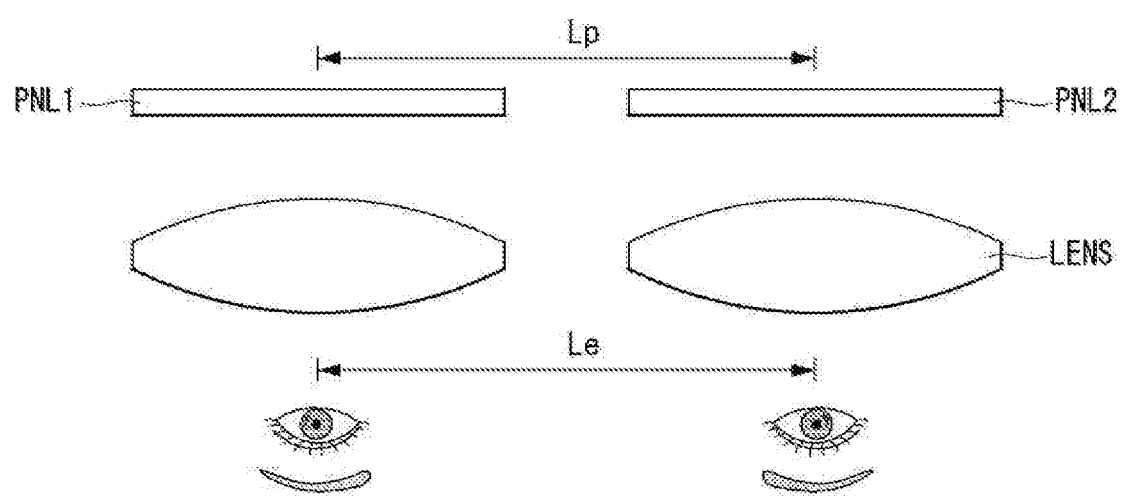
FIG. 3 illustrates a distance between first and second display panels shown in FIG. 2.

FIG. 2 shows first and second display panels PNL1 and PNL2 of the display module 913 shown in FIG. 1. FIG. 3 illustrates a distance between the first and second display panels PNL1 and PNL2 shown in FIG. 2. Each of the first and second display panels PNL1 and PNL2 is implemented as an organic light emitting diode (OLED) display panel having a fast response time, excellent color reproduction characteristic, and excellent viewing angle characteristic. In case of the EGD, the first and second display panels PNL1 and PNL2 may be implemented as a transparent OLED display panel.

Referring to FIGS. 2 and 3, the first and second display panels PNL1 and PNL2 are separately manufactured and are disposed to be separated from each other on the display module 913. PNL1 and PNL2 are adjacent to each other in the horizontal x direction, but the display panels PNL1 and PNL2 (and their respective pixel arrays AA) are separated from each other by a gap G.

Figure 7:
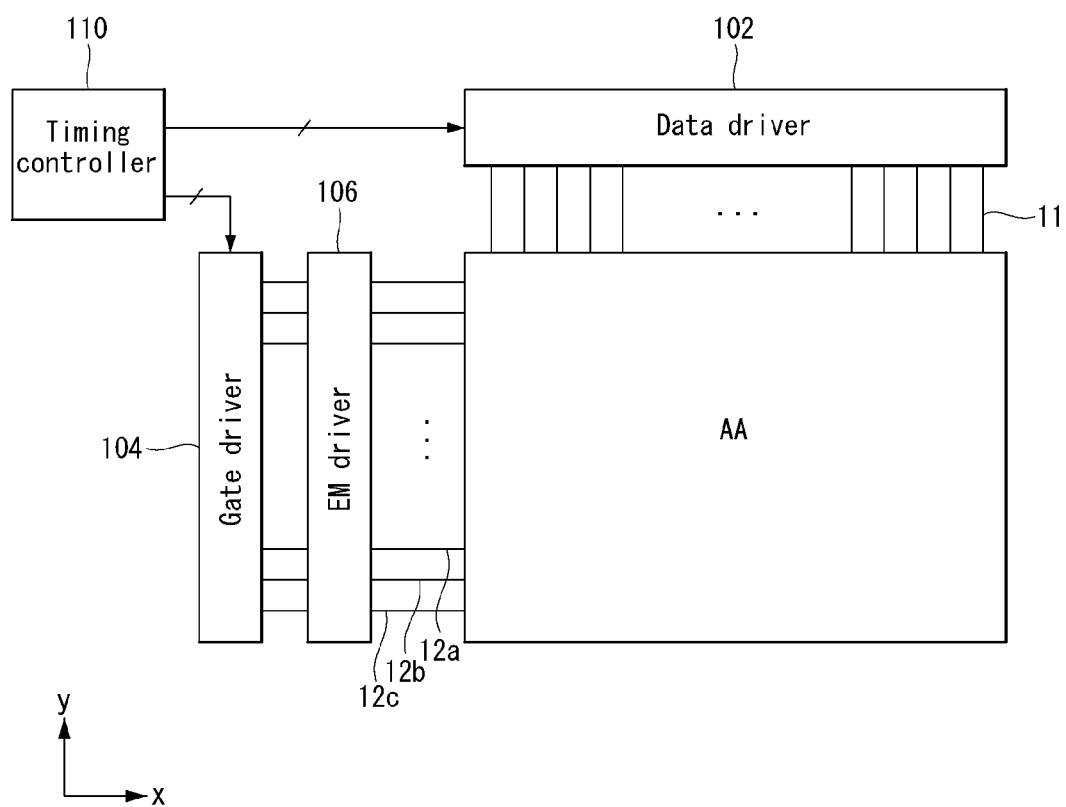
FIG. 7 is a block diagram showing configuration of a display panel shown in FIG. 2.

In FIG. 2, "DIC (drive integrated circuit)" is an integrated circuit (IC) chip, into which a timing controller 110 and a data driver 102 shown in FIG. 7 are integrated. GIP (gate-in panel)" is a circuit, into which a gate driver 104 and an emission (abbreviated to "EM") driver 106 shown in FIG. 7 and a pixel array are integrated on the same substrate. There are two DIC's, one to drive display lines (not shown) of display panel PNL1, and another to drive display lines (not shown) of display panel PNL2.

A distance Lp between a center of a pixel array AA of the first display panel PNL1 and a center of a pixel array AA of the second display panel PNL2 may be substantially the same as a distance Le between both eyes of the user. The distance Lp between the center of the pixel array AA of the first display panel PNL1 and the center of the pixel array AA of the second display panel PNL2 may be set to Le±α. The distance Le between both eyes of the user is a distance between a pupil of the left eye and a pupil of the right eye and is about 6.5 cm (=65 mm). Thus, the distance Le is typically in the range of 58 mm to 72 mm. The distance Le may slightly vary depending on races. "α" is a margin designed in consideration of the display panel driving circuit (for example, GIP of FIG. 2) disposed between the first and second display panels PNL1 and PNL2, a process deviation, etc. and may be set to 10% of Le.

The pixel array AA of each of the first and second display panels PNL1 and PNL2 has a landscape type aspect ratio, in which a length in a horizontal direction x is longer than a length in a vertical direction y, in consideration of a vertical viewing angle and a horizontal viewing angle. Direction x is perpendicular to direction y. In the personal immersive device, an improvement effect of the viewing angle when increasing the horizontal viewing angle is greater than an improvement effect of the viewing angle when increasing the vertical viewing angle. The embodiment of the invention manufactures each of the first and second display panels PNL1 and PNL2 as a landscape type OLED display panel, so as to maximize the horizontal viewing angle in the personal immersive device.

In the landscape type aspect ratio, the number of pixels in the horizontal direction x is more than the number of pixels in the vertical direction y, and the length in the horizontal direction x is longer than the length in the vertical direction y. Further, in a portrait type aspect ratio, the number of pixels in the vertical direction y is more than the number of pixels in the horizontal direction x, and a length in the vertical direction y is longer than a length in the horizontal direction x.

The present inventors conducted an experiment on a stereoscopic feeling, an immersion, and a fatigue the user feels while changing types of the display panel of the personal immersive device. According to the result of the experiment, as shown in FIG. 3, when the pixel arrays of the first and second display panels PNL1 and PNL2 were separated from each other by the distance between both eyes of the user, the present inventors confirmed that the stereoscopic feeling the user feels was greatly improved. When the pixel arrays of the first and second display panels PNL1 and PNL2 are separated from each other and the distance between the centers of the pixel arrays of the first and second display panels PNL1 and PNL2 is the same as the distance between the left eye and the right eye of the user, the viewing angle widens and a large improvement effect of the stereoscopic feeling is obtained. In the personal immersive device according to the embodiment of the invention, the pupil of the user's left eye corresponds to the center of the pixel array AA of the first display panel PNL1, and the pupil of the user's right eye corresponds to the center of the pixel array AA of the second display panel PNL2.

The stereoscopic feeling the user feels is better in the landscape type aspect ratio than the portrait type aspect ratio. The embodiment of the invention can improve the stereoscopic feeling by separately disposing a landscape type display panel for left eye and a landscape type display panel for right eye at the personal immersive device.

The first and second pixel arrays AA may be respectively disposed on separate substrates, so that the first pixel array AA, on which the left eye image is displayed, and the second pixel array AA, on which the right eye image is displayed, are separate from each other. In this instance, the first pixel array AA is disposed on a substrate of the first display panel PNL1, and the second pixel array AA is disposed on a substrate of the second display panel PNL2. In another embodiment, the first and second pixel arrays may be separated from each other on one substrate. In this instance, the first and second pixel arrays may be separated from each other on one display panel. In the embodiment disclosed herein, the fact that the first and second pixel arrays are separated from each other indicates that data lines, gate lines (or scan lines), and pixels of the first and second pixel arrays are separated from each other. Because the first and second pixel arrays AA are separated from each other but may be driven through the same driving signal system, the first and second pixel arrays AA may share at least a portion of the display panel driving circuit with each other.

When the two pixel arrays AA are separately disposed on one substrate, this configuration may provide various effects in addition to the improvement of the stereoscopic feeling. A related art VR device forms one pixel array on one substrate and displays a left eye image and a right eye image on the one pixel array. Namely, the related art VR device does not divide the pixel array into separate portions. Unlike the related art, the embodiment of the invention divides the display panel into the two display panels PNL1 and PNL2 and divides the pixel array AA into the two pixel arrays, or separately disposes the two pixel arrays on one substrate. Thus, there is a difference between the embodiment of the invention and the related art in whether or not the pixel array is divided. The embodiment of the invention can dispose the pixel arrays AA more freely than the related art because of the difference and can dispose the pixel arrays AA respectively corresponding to the left eye and the right eye of people in an optimum ratio of the viewing angle, thereby maximizing the stereoscopic feeling.

Because the structure of the display panel according to the embodiment of the invention reduces the area of the pixel array in terms of the productivity, the embodiment of the invention can reduce a defective percentage and increase the yield.

When a distance between the pixel arrays AA decreases, the screen size decreases. Therefore, a display image becomes narrow. On the contrary, when the distance between the pixel arrays AA increases, the centers of the pixel arrays corresponding to both eyes of the user move to the outside of the screen. Hence, the immersion and the stereoscopic feeling may be reduced. When the distance between both eyes of the user is 65 mm and the centers of the separated pixel arrays AA accurately correspond to the pupils of both eyes of the user, the user wearing the personal immersive device can perceive a stereoscopic image while feeling the maximum stereoscopic feeling. When the distance between the pixel arrays AA decreases or increases in an excessive manner, the viewing angle may be optically compensated for using the fisheye lens, or the distance between the left eye image and the right eye image may be adjusted based on the distance between the both eyes of the user through the image processing. However, the method leads to a reduction of the display efficiency in terms of viewing angle. In other words, when the pixel arrays are separately disposed and the centers of the pixel arrays accurately correspond to the pupils of the left and right eyes of the user as in the embodiment of the invention, the user can watch the most accurate stereoscopic image.

In the personal immersive device, the fisheye lens exists between the user's eye and the display panel, and a distance between the user's eye and the display panel is as short as several centimeters. When the user watches an image reproduced on the display panels PNL1 and PNL2 through the fisheye lenses, the user watches an image which is four to five times larger than the size of a real screen displayed on the display panels PNL1 and PNL2. When a resolution of the display panel is reduced in an environment where it is visible to the user's eyes in the proximity of the display panel and the fisheye lens is applied, a non-emission area of the pixels increases. Hence, a screen door effect increases, and immersion is reduced. The pixel array of each of the first and second display panels PNL1 and PNL2 has a resolution equal to or greater than QHD (quad high definition) resolution (1440×1280), a pixel density equal to or greater than 500 ppi (pixels per inch), and a pixel aperture ratio equal to or greater than 14%, so as to increase the immersion of the personal immersive device. In the QHD resolution 1440×1280, "1440" is the number of pixels of the pixel array in the horizontal direction x, and "1280" is the number of pixels of the pixel array in the vertical direction y. The pixel array AA may have a pixel density of 500 ppi to 600 ppi and a pixel aperture ratio of 14% to 20%, considering a technology level of the producible OLED display panels.

When the personal immersive device displays a 3D motion picture, an increase in a total latency may lead to screen retention or motion blur. The screen retention or the motion blur of the 3D motion picture reduces the quality of the 3D motion picture and also increases a fatigue of the user. The total latency is a system processing time required to process data through the main board 914, added to a time to transmit the data to the display module 913, and added to a delay time of the display module 913. The delay time of the display module 913 is a frame delay time, at which an input image is delayed during one frame period, added to a response time of the pixels.

The embodiment of the invention reduces the fatigue of the user by reducing the response time of the pixels and increasing a frame rate (or a refresh rate) when the personal immersive device displays the 3D motion picture. To this end, the embodiment of the invention manufactures switching elements and driving elements of the pixels of each of the display panels PNL1 and PNL2 as an n-type metal oxide semiconductor field effect transistor (MOSFET). Hence, the embodiment of the invention reduces a response time of a pixel circuit to 2 msec and increases the frame rate to a value equal to or greater than 90 Hz, shortening a data update cycle. When the frame rate is 90 Hz, the data update cycle (i.e., one frame period) is approximately 11.1 ms. Thus, the embodiment of the invention reduces the delay time of the display module 913 of the personal immersive device to about 13 msec and can reduce the total latency to a level equal to or less than 25 ms. Data of the input image is addressed to the pixels through the data update cycle.

Figure 4:
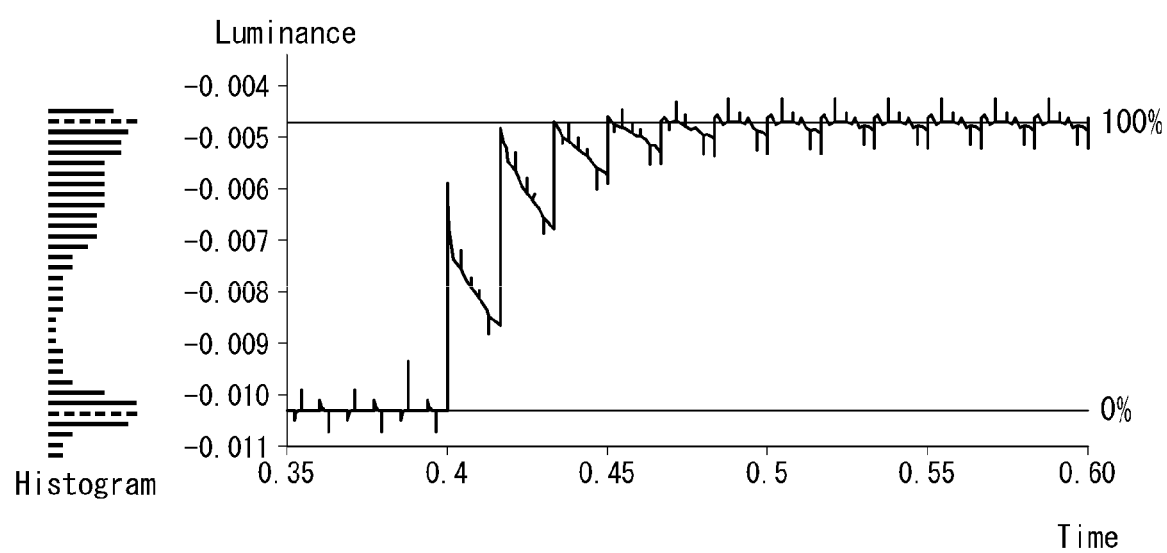
FIGS. 4 to 6 illustrate a result of measurement of a response time according to an exemplary embodiment of the invention.
Figure 5:
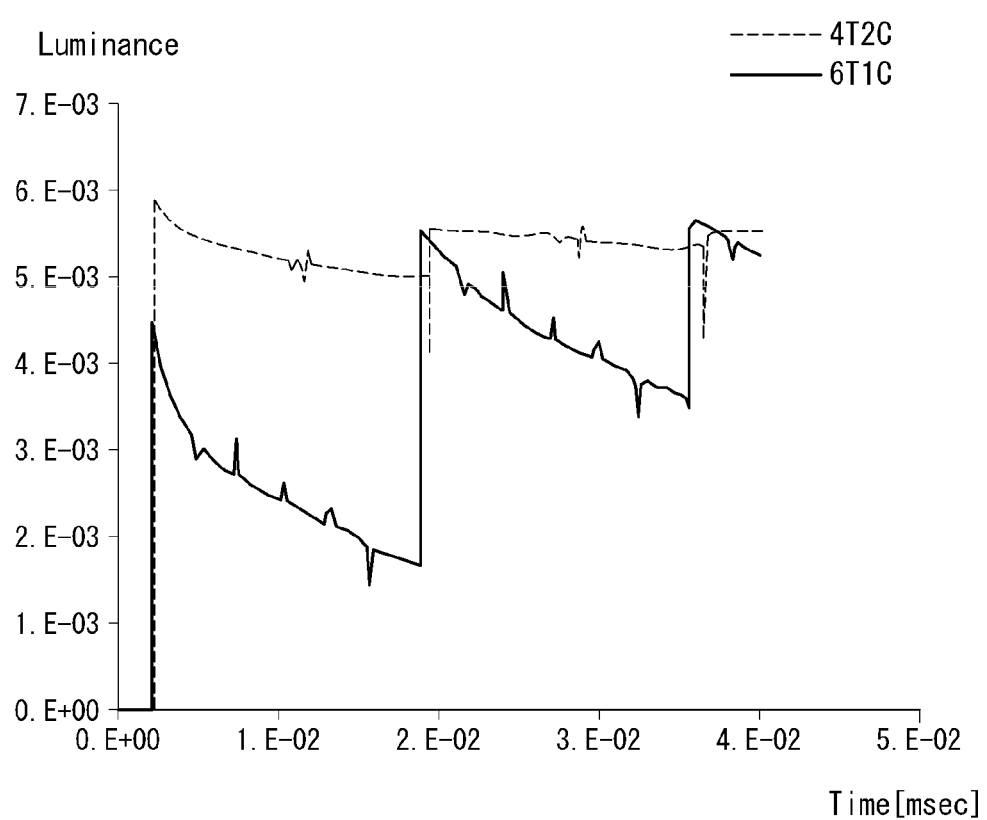
Figure 6:
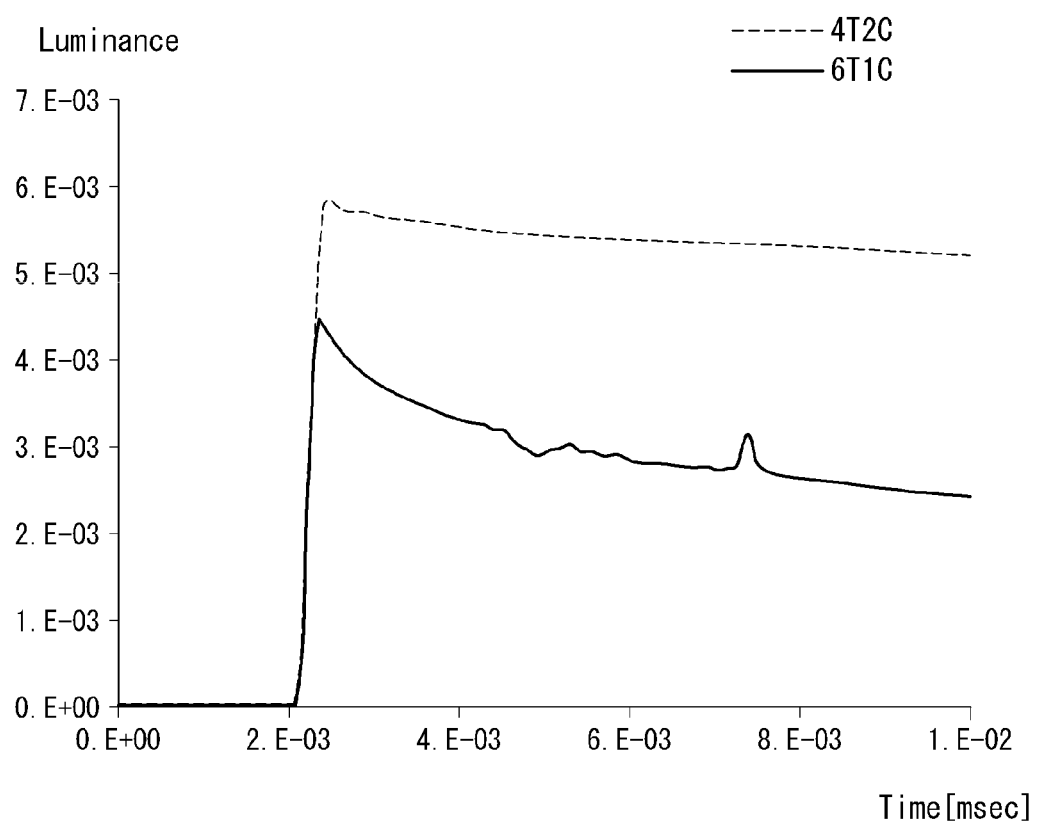

FIGS. 4 to 6 illustrate a result of measurement of a response time according to the embodiment of the invention.

In FIGS. 4 to 6, x-axis is time (msec), and y-axis is a relative value of a luminance measured using a luminance meter. FIG. 6 is an enlarged view of a rising section of measured luminances of FIG. 5. In FIGS. 5 and 6, "4T2C" represented by the dotted line indicates a response time of a pixel circuit (refer to FIG. 9) including four n-type MOSFETs and two capacitors, and "6T1C" represented by the solid line indicates a response time of a pixel circuit (not shown) including six n-type MOSFETs and one capacitor.

Examples of a method for measuring the response time include a B-to-W (black to white) method and a G-to-G (gray to gray) method.

The B-to-W method measures time required to change from a black pixel to a white pixel. In case of a liquid crystal display, the B-to-W method measures time required to change from a completely opened state of liquid crystals to a completely closed state of the liquid crystals or time required to change from a completely closed state of liquid crystals to a completely opened state of the liquid crystals.

The G-to-G method measures a response time between bright gray close to white and dark gray close to black. When a white luminance is generally regarded as 100%, the G-to-G method measures time required to reach a luminance of 90% from a luminance of 10%.

The method for measuring the response time according to the embodiment of the invention used the G-to-G method. The method for measuring the response time according to the embodiment of the invention measures a luminance on the screen while displaying a black image on the screen for a predetermined time (e.g., for 500 ms), then displaying a white image on the screen for a predetermined time, and then again displaying the black image on the screen for a predetermined time. The method for measuring the response time according to the embodiment of the invention makes a histogram representing luminances measured using the luminance meter. The dotted line of the lower part of the histogram is the most frequently measured black luminance, and is considered to be the reference black luminance (=0%). The dotted line of the upper part of FIG. 4 is the most frequently measured white luminance, and is considered to be the reference white luminance (=100%). The method for measuring the response time according to the embodiment of the invention measures a change from 10% to 90% of the reference white luminance (=100%) as a rising time and measures a change from 90% to 10% of the reference white luminance (=100%) as a falling time. The response time according to the embodiment of the invention is measured as a sum of the rising time and the falling time. Thus, the response time according to the embodiment of the invention is measured as a sum of a response time required in a rise from 10% to 90% of the reference white luminance (=100%) and a response time required in a fall from 90% to 10% of the reference white luminance (=100%).

An embodiment of the invention has a response time, which is greater than zero and is equal to or less than 2 ms, measured through the above-described method using the display panel implementing the pixel array using the pixel circuit 4T2C including the n-type MOSFETs.

As can be seen from FIGS. 5 and 6, the pixel circuit using the n-type MOSFET rapidly increases a luminance of the pixel to a luminance equal to or greater than 90% of a target luminance within 2 msec at a frame rate of 60 Hz. Thus, the pixel circuit 4T2C using the n-type MOSFETs has a response time of 2 msec or less, which is much shorter than one frame period (about 16.67 ms). On the other hand, the pixel circuit 6T1C using p-type MOSFETs may increase a luminance of the pixel to a luminance equal to or greater than 90% of a target luminance at a frame rate of 60 Hz after time equal to or greater than two frame periods (about (16.67×2) ms) passed. Therefore, in a 6T1C pixel using p-type MOSFETs, a response time is equal to or greater than two frame periods.

The embodiment of the invention duty-drives each of the display panels PNL1 and PNL2 and controls a duty ratio of the pixels to a value equal to or less than 50% when the personal immersive device displays the 3D motion picture. Hence, the embodiment of the invention can further reduce the fatigue of the user using a black data insertion (BDI) effect. The duty ratio of the pixels is a percentage of an emission time of the pixels with respect to a given emission time. For example, the fact that the pixels emit light at a duty ratio equal to or less than 50% when a given emission time is one frame period means that the pixels emit light for time equal to or less than one half of one frame period. The duty-drive of the pixels can obtain an improvement of the motion blur and a reduction in an image persistence time using the BDI effect and can prevent the image retention and a flicker. Further, the duty-drive of the pixels can reduce the fatigue of the user watching the 3D motion picture by reducing an amount of current of the pixel at a low gray level.

Figure 8:
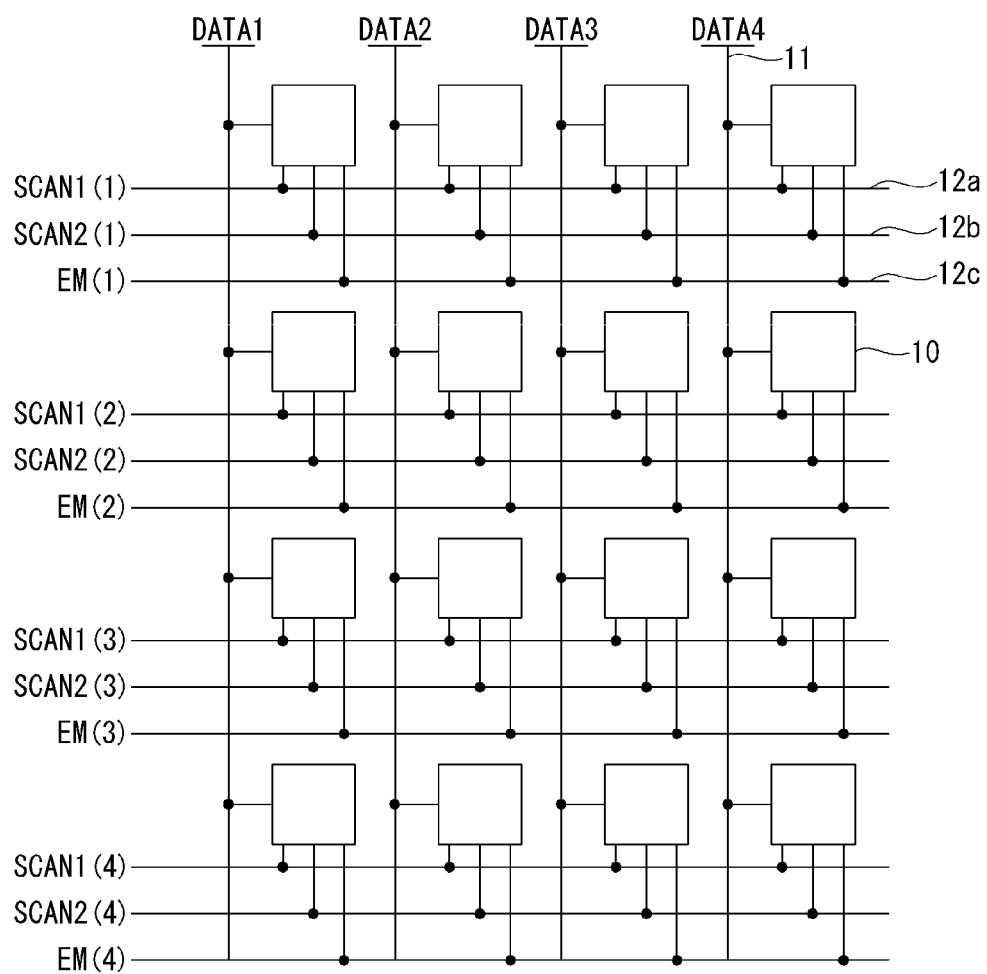
FIG. 8 schematically illustrates a portion of a pixel array shown in FIG. 7.
Figure 9:
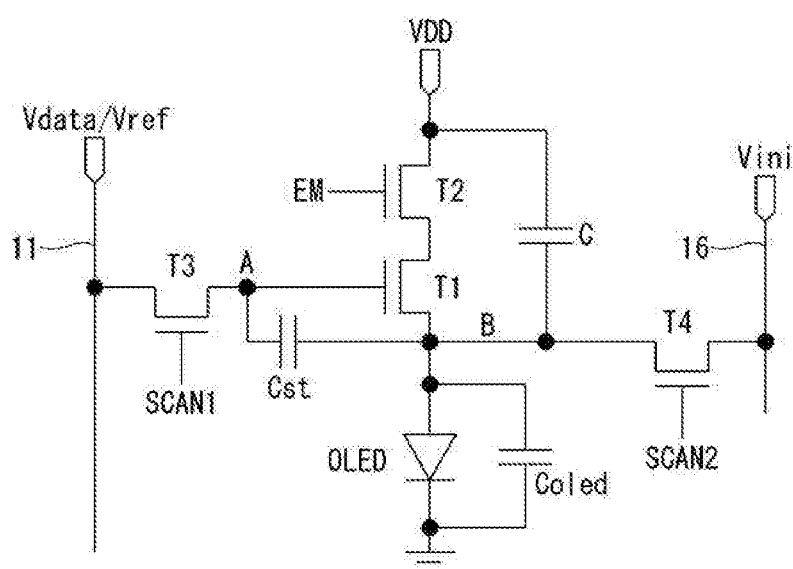
FIG. 9 is an equivalent circuit diagram showing an example of a pixel circuit.
Figure 10:
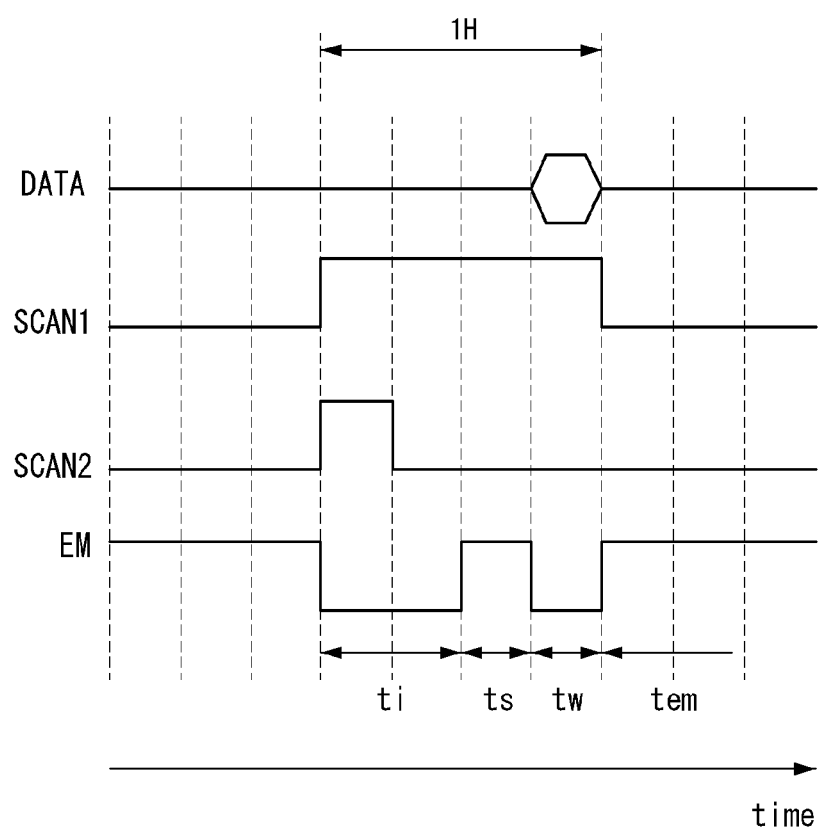
FIG. 10 is a waveform diagram illustrating signals input to a pixel shown in FIG. 9.

FIG. 7 is a block diagram showing configuration of the display panel shown in FIG. 2. FIG. 8 schematically illustrates a portion of a pixel array shown in FIG. 7. FIG. 9 is an equivalent circuit diagram showing an example of a pixel circuit. FIG. 10 is a waveform diagram illustrating signals input to a pixel shown in FIG. 9.

Referring to FIGS. 7 to 10, each of the first and second display panels PNL1 and PNL2 according to the embodiment of the invention includes the pixel array AA displaying an input image and the display panel driving circuit for writing data of the input image on the pixel array AA.

The display panel driving circuit includes a data driver 102, a gate driver 104, an (abbreviated to "EM") driver 106, and a timing controller 110. The display panel driving circuit further includes a power circuit (not shown). The power circuit generates electric power required to drive the data driver 102, the gate driver 104, the EM driver 106, the timing controller 110, and the display panels PNL1 and PNL2.

At least a portion of the display panel driving circuit may be disposed on the surface of a substrate between the first and second pixel arrays AA. The first and second display panels PNL1 and PNL2 may share at least a portion (for example, the timing controller 110 of FIG. 7) of the display panel driving circuit with each other. The display panel driving circuit addresses data to pixels 10 of the display panels PNL1 and PNL2 at a high frame rate equal to or greater than 90 Hz and writes the data on the pixels 10.

A plurality of data lines 11 and a plurality of gate lines 12a, 12b, and 12c cross each other on the pixel array AA, and the pixels 10 are arranged in a matrix form. The pixel array AA includes a reference voltage line (hereinafter referred to as "REF line") 16 commonly connected to the pixels 10 and a VDD line (not shown) used to supply a high potential driving voltage VDD to the pixels 10. A predetermined initialization voltage Vini may be supplied to the pixels 10 through the REF line 16.

The gate lines 12a, 12b, and 12c include a plurality of first scan lines 12a supplied with a first scan pulse SCAN1, a plurality of second scan lines 12b supplied with a second scan pulse SCAN2, and a plurality of EM signal lines 12c supplied with an EM signal EM.

Each pixel 10 includes a red subpixel, a green subpixel, and a blue subpixel for color representation. Each pixel 10 may further include a white subpixel. One data line 11, the gate lines 12a, 12b, and 12c, the REF line 16, the VDD line, etc. are connected to each pixel 10.

One frame period is divided into a scanning period, in which data is addressed to the pixels 10 and data of the input image is written on each pixel 10, and a duty driving period, in which the pixels 10 emit light at a predetermined duty ratio in response to the AC EM signal EM after the scanning period. The AC EM signal EM is generated at a duty ratio equal to or less than 50% during the duty driving period and causes the pixels 10 to emit light at the duty ratio equal to or less than 50%. Because the scanning period is about one horizontal period, the duty driving period occupies most of one frame period. Capacitors of the pixels 10 are charged with a data voltage during the scanning period. The pixels 10 repeatedly perform an emission operation (or a turn-on operation) and a non-emission operation (or a turn-off operation) in response to the AC EM signal EM. Light emission of the pixels are thus switched on and off depending on a state of the emission signal EM. Each pixel 10 repeatedly performs the turn-on operation and the turn-off operation during one frame period and emits light at the duty ratio equal to or less than 50%. The pixels 10 are turned off and then emit light using the data voltage charged to the capacitors. Therefore, during the duty driving period following the scanning period, the pixels 10 are not additionally supplied with the data voltage and are driven at the duty ratio equal to or less than 50%. Hence, data is displayed at the same luminance during one frame period.

The data driver 102 converts data DATA of the input image received from the timing controller 110 into a gamma compensation voltage under the control of the timing controller 110 and generates the data voltage. The data driver 102 outputs the data voltage to the data lines 11. The data driver 102 may output a predetermined reference voltage Vref to the data lines 11 during an initialization period ti, so as to initialize the driving elements of the pixels 10.

The gate driver 104 supplies the first and second scan pulses SCAN1 and SCAN2 to the first and second scan lines 12a and 12b under the control of the timing controller 110. The first and second scan pulses SCAN1 and SCAN2 are synchronized with the data voltage. When the data voltage is supplied to the pixels, the first scan pulse SCAN1 maintains an on-level and turns on a switching element T3, thereby selecting the pixels 10 to be charged with the data voltage. The second scan pulse SCAN2 rises at the same time as the first scan pulse SCAN1 and falls earlier than the first scan pulse SCAN1, thereby initializing the pixels 10 during the initialization period ti. The second scan pulse SCAN2 rises at the same time as the first scan pulse SCAN1 and falls before a sampling period ts.

The gate driver 104 shifts the scan pulses SCAN1 and SCAN2 using a shift register and sequentially supplies the scan pulses SCAN1 and SCAN2 to the scan lines 12a and 12b. The shift register of the gate driver 104 may be directly formed on the substrate of the display panel along with the pixel array AA through a gate-in panel (GIP) process.

The EM driver 106 is a duty driver that outputs the EM signal EM under the control of the timing controller 110 and supplies the EM signal EM to the EM signal lines 12c. The EM driver 106 shifts the EM signal EM using a shift register and sequentially supplies the EM signal EM to the EM signal lines 12c. The EM driver 106 repeatedly toggles the EM signal EM during the duty driving period under the control of the timing controller 110 and drives the pixels 10 at a duty ratio equal to or less than 50%. The shift register of the EM driver 106 may be directly formed on the substrate of the display panel along with the pixel array AA through the GIP process.

The timing controller 110 receives digital video data DATA of the left eye image and the right eye image received from the main board 914 and a timing signal synchronized with the digital video data DATA. The timing signal includes a vertical sync signal Vsync, a horizontal sync signal Hsync, a clock signal CLK and a data enable signal DE. The timing controller 110 generates a data timing control signal for controlling operation timing of the data driver 102, a gate timing control signal for controlling operation timing of the gate driver 104, and a duty timing control signal for controlling operation timing of the EM driver 106 based on the timing signal received from the main board 914 and a predetermined register setting value. The timing controller 110 controls a duty ratio of the EM signal EM using the duty timing control signal.

As shown in FIG. 9, each pixel 10 includes an OLED, a plurality of thin film transistors (TFTs) T1 to T4, and a storage capacitor Cst. A capacitor C may be connected between a drain of the second TFT T2 and a second node B. In FIG. 9, "Coled" denotes a parasitic capacitance of the OLED. The TFTs are implemented as the n-type MOSFET. During the scanning period, the pixels 10 sample a threshold voltage of the driving TFT T1 and are supplied with the data voltage of the input image. During a duty driving period tem, the pixels 10 emit light at a duty ratio equal to or less than 50%. The scanning period is divided into the initialization period ti, in which the pixels 10 are initialized, the sampling period ts, in which the threshold voltage of the driving element of each pixel 10 is sampled, and a programming period tw, in which the data voltage of the input image is supplied to the pixels 10.

The OLED emits light using an amount of current controlled by the first driving TFT T1 depending on the data voltage output from the data driver 102. A current path of the OLED is switched by the second TFT T2. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. The anode of the OLED is connected to the second node B, and the cathode of the OLED is connected to a VSS electrode, to which a low potential power voltage or a ground level voltage VSS is applied. "Coled" denotes a parasitic capacitance formed between the anode and the cathode of the OLED.

The first TFT T1 is a driving element adjusting a current flowing in the OLED depending on a gate-to-source voltage Vgs. The first TFT T1 includes a gate connected to a first node A, a drain connected to a source of the second TFT T2, and a source connected to the second node B.

The second emission TFT T2 is a switching element switching a current flowing in the OLED on and off in response to the EM signal EM. The EM signal EM is generated at an on-level during the sampling period ts and repeats the on-level and an off-level during the duty driving period. Hence, the EM signal EM is generated at a duty ratio equal to or less than 50%. The drain of the second TFT T2 is connected to the VDD line supplied with the high potential driving voltage VDD, and the source of the second TFT T2 is connected to the drain of the first TFT T1. A gate of the second TFT T2 is connected to the EM signal line 12c and is supplied with the EM signal EM. The EM signal EM is generated at the on-level (or a high logic level) during the sampling period ts and turns on the second TFT T2. The EM signal EM is inverted to the off-level (or a low logic level) during the initialization period ti and the programming period tw and turns off the second TFT T2. The EM signal EM repeats the on-level and the off-level depending on a pulse width modulation (PWM) duty ratio and is generated at a duty ratio equal to or less than 50% during the duty driving period tem. The OLED emits light at a duty ratio equal to or less than 50% due to the second TFT T2 switching in response to the EM signal EM.

The third scan TFT T3 is a switching element supplying the data voltage Vdata to the capacitor Cst at first node A in response to the first scan pulse SCAN1. The third TFT T3 includes a gate connected to the first scan line 12a, a drain connected to the data line 11, and a source connected to the first node A. The first scan pulse SCAN1 is supplied to the pixels 10 through the first scan line 12a. The first scan pulse SCAN1 is generated at an on-level during about one horizontal period 1H and turns on the third TFT T3. The first scan pulse SCAN1 is inverted to an off-level during the duty driving period tem and turns off the third TFT T3.

The fourth TFT T4 is a switching element supplying the reference voltage Vref to the second node B in response to the second scan pulse SCAN2. The fourth TFT T4 includes a gate connected to the second scan line 12b, a drain connected to the REF line 16, and a source connected to the second node B. The second scan pulse SCAN2 is supplied to the pixels 10 through the second scan line 12b. The second scan pulse SCAN2 is generated at an on-level during the initialization period ti and turns on the fourth TFT T4. The second scan pulse SCAN2 maintains an off-level during the remaining period and controls the fourth TFT T4 in an Off-state.

The storage capacitor Cst is connected between the first node A and the second node B and stores a difference voltage between the first node A and the second node B, thereby holding the gate-to-source voltage Vgs of the first TFT T1. The storage capacitor Cst samples a threshold voltage Vth of the driving element, i.e., the first TFT T1 in a source follower manner. The capacitor C is connected between the VDD line and the second node B. When a voltage of the first node A changes depending on the data voltage Vdata scanned in during the programming period tw, the capacitors Cst and C divide a change amount of the voltage of the first node A and reflect the divided voltage on a voltage of the second node B.

The scanning period of the pixel 10 is divided into the initialization period ti, the sampling period ts, and the programming period tw, as shown in FIG. 10. The scanning period is set to about one horizontal period 1H, and data is written on the pixels 10 arranged on one horizontal line of the pixel array during the scanning period. During the scanning period, the threshold voltage Vth of the driving element, i.e., the first TFT T1 of the pixel 10 is sampled, and the data voltage is compensated by an amount of the threshold voltage Vth. Thus, during one horizontal period 1H, data DATA of the input image is compensated by an amount of the threshold voltage Vth of the driving element T1 and is written on the pixel 10.

When the initialization period ti starts, the first and second scan pulses SCAN1 and SCAN2 rise and are generated at the on-level. And at the same time, the EM signal EM falls and changes to the off-level. During the initialization period ti, the second TFT T2 is turned off and blocks a current path of the OLED. During the initialization period ti, the third and fourth TFTs T3 and T4 are turned on. During the initialization period ti, the predetermined reference voltage Vref is supplied to the data line 11. During the initialization period ti, the voltage of the first node A is initialized to the reference voltage Vref, and the voltage of the second node B is initialized to the predetermined initialization voltage Vini. After the initialization period ti, the second scan pulse SCAN2 changes to the off-level and turns off the fourth TFT T4. The on-level is a voltage level of a gate voltage of the TFT that causes the switching elements T2 to T4 of the pixel 10 to be turned on. The off-level is a voltage level of the gate voltage of the TFT that causes the switching elements T2 to T4 of the pixel 10 to be turned off.

During the sampling period ts, the first scan pulse SCAN1 maintains the on-level, and the second scan pulse SCAN2 maintains the off-level. When the sampling period ts starts, the EM signal EM rises and changes to the on-level. During the sampling period ts, the second and third TFTs T2 and T3 are turned on. During the sampling period ts, the second TFT T2 is turned on in response to the EM signal EM of the on-level. During the sampling period ts, the third TFT T3 maintains the On-state due to the first scan pulse SCAN1 of the on-level. During the sampling period ts, the reference voltage Vref is supplied to the data line 11. During the sampling period ts, the voltage of the first node A is held at the reference voltage Vref, and the voltage of the second node B rises due to a drain-to-source current Ids. The gate-to-source voltage Vgs of the first TFT T1 is sampled as the threshold voltage Vth of the first TFT T1 through the source follower manner, and the sampled threshold voltage Vth is stored in the storage capacitor Cst. During the sampling period ts, the voltage of the first node A is the reference voltage Vref, and the voltage of the second node B is "Vref−Vth".

During the programming period tw, the third TFT T3 maintains the On-state in response to the first scan pulse SCAN1 of the on-level, and the remaining TFTs T1, T2, and T4 are turned off. During the programming period tw, the data voltage Vdata of the input image is supplied to the data line 11. The data voltage Vdata is applied to the first node A, and the result of voltage division between the capacitors Cst and C with respect to a change amount (Vdata−Vref) of the voltage of the first node A is reflected on the voltage of the second node B. Hence, the gate-to-source voltage Vgs of the first TFT T1 is programmed. During the programming period tw, the voltage of the first node A is the data voltage Vdata, and the voltage of the second node B is "Vref−Vth+ C'*(Vdata−Vref)" obtained by adding the result (C'*(Vdata−Vref)) of voltage division between the capacitors Cst and C to the voltage "Vref−Vth" set through the sampling period ts. As a result, the gate-to-source voltage Vgs of the first TFT T1 is programmed to "Vdata−Vref+Vth−C'*(Vdata−Vref)" through the programming period tw. In the embodiment disclosed herein, C' is Cst/(Cst+C).

When the duty driving period tem starts, the EM signal EM rises and again changes to the on-level. On the other hand, the first scan pulse SCAN1 falls and changes to the off-level. During the duty driving period tem, the second TFT T2 maintains the On-state and forms a current path of the OLED. During the duty driving period tem, the first TFT T1 controls an amount of current flowing in the OLED based on the data voltage Vdata.

The duty driving period tem ranges from after the programming period tw to the initialization period ti of a next frame period. The embodiment of the invention causes the pixels 10 not to successively emit light during the duty driving period tem and causes the pixels 10 to emit light at a duty ratio equal to or less than 50% through the switching of the EM signal EM. When the EM signal EM is generated at the on-level, the second TFT T2 is turned on and forms the current path of the OLED. During the duty driving period tem, a current Ioled controlled based on the gate-to-source voltage Vgs of the first TFT T1 flows in the OLED and causes the OLED to emit light. During the duty driving period tem, because the first and second scan pulses SCAN1 and SCAN2 maintain the off-level, the third and fourth TFTs T3 and T4 are turned off.

The current Ioled flowing in the OLED during the duty driving period tem is expressed by the following Equation 1. The OLED emits light due to the current Ioled and represents brightness of the input image.

$$I_{oled} = \frac{k}{2}[(1-C')(V_{data}-V_{ref})]^2 \quad \text{[Equation 1]}$$

In the above Equation 1, k is a proportional constant determined by a mobility, a parasitic capacitance, a channel capacity, etc. of the first TFT T.

Because the threshold voltage Vth of the first TFT T1 is included in the gate-to-source voltage Vgs of the first TFT T1 programmed through the programming period tw, Vth is cancelled in Ioled expressed in Equation 1. Thus, an influence of the threshold voltage Vth of the driving element, i.e., the first TFT T1 on the current Ioled of the OLED is removed.

Figure 11:
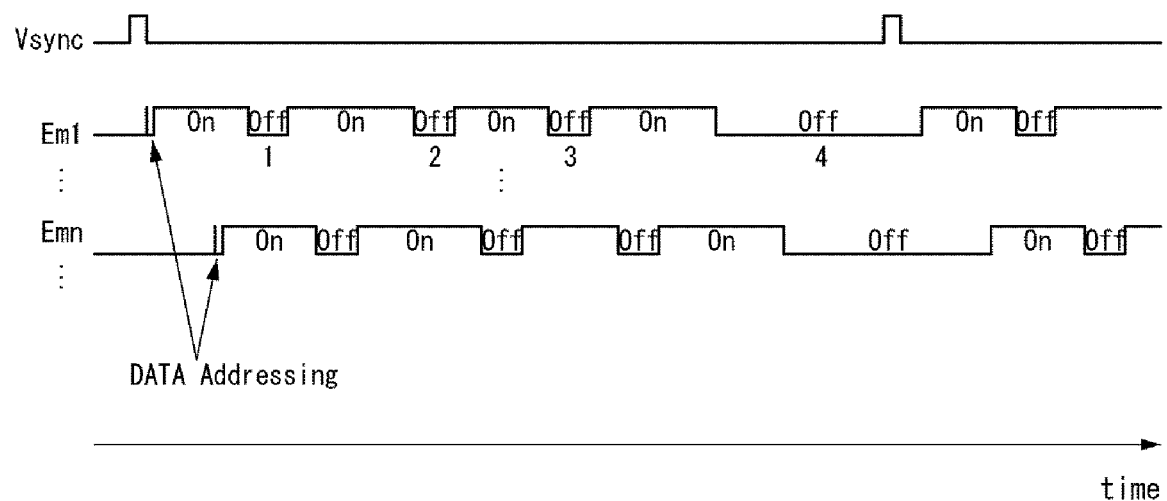
FIG. 11 is a waveform diagram illustrating a duty driving method of a pixel circuit according to an exemplary embodiment of the invention.
Figure 12:
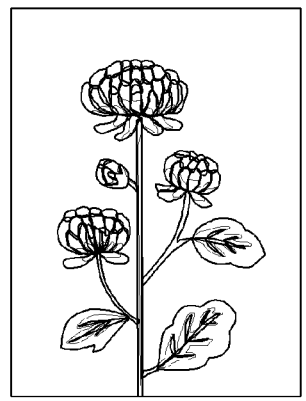
FIG. 12 illustrates a black data insertion (BDI) effect in a duty driving method of a pixel circuit according to an exemplary embodiment of the invention.
Figure 12:
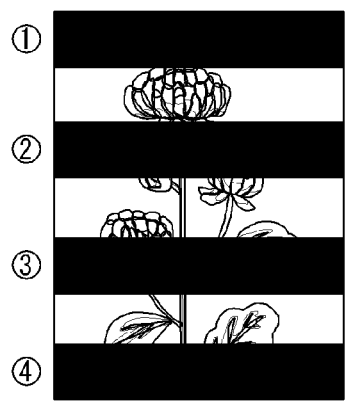
Figure 12:
Figure 12:
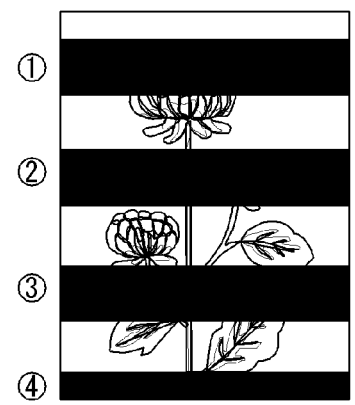
Figure 12:
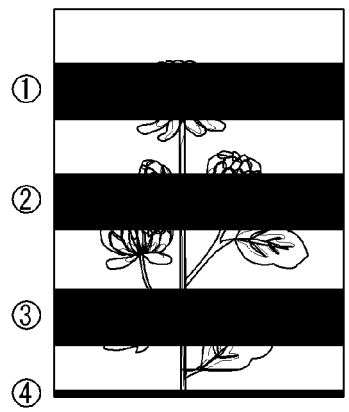
Figure 12:
Figure 12:
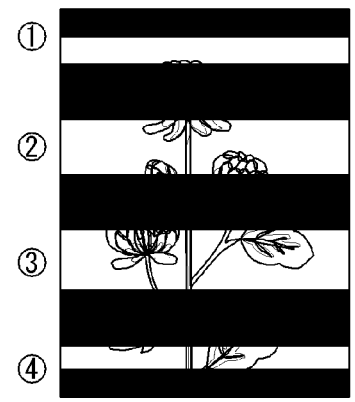
Figure 13:
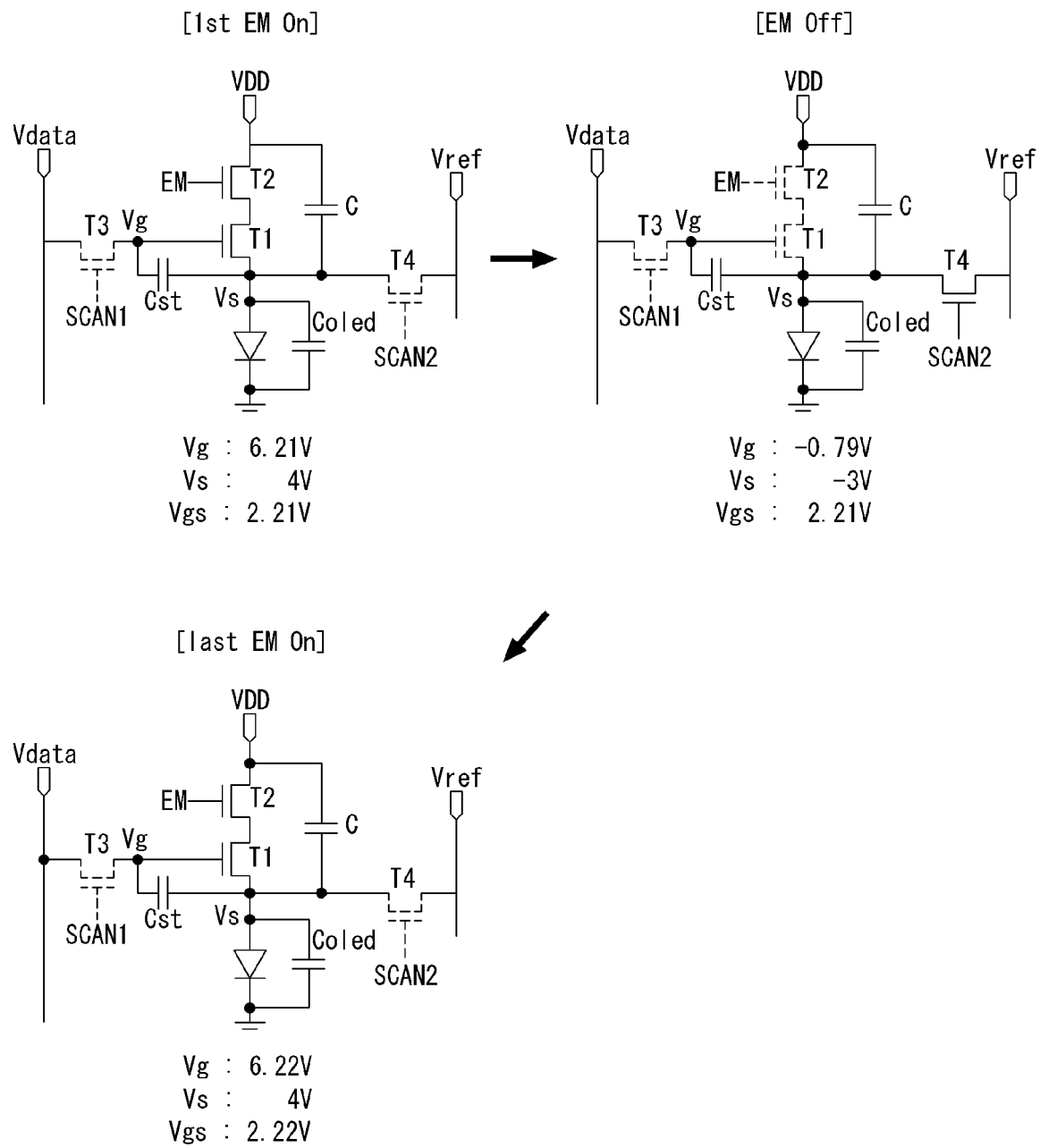
FIG. 13 illustrates a principle, in which data of a pixel is maintained during one frame period without additional data addressing.

FIG. 11 is a waveform diagram illustrating a duty driving method of a pixel circuit according to the embodiment of the invention. FIG. 12 illustrates a BDI effect in a duty driving method of a pixel circuit according to the embodiment of the invention. In FIG. 12, (a) shows an image of one frame. (b) of FIG. 12 shows an example where a non-duty driving period (i.e., turn-off period) is sequentially shifted when the same image as (a) of FIG. 12 is displayed on the pixels using the duty driving method. FIG. 13 illustrates a principle, in which data of a pixel is maintained during one frame period without additional data addressing.

Referring to FIGS. 11 and 12, the vertical sync signal Vsync is a timing signal defining one frame period. During one frame period, image data corresponding to an amount of one frame is addressed to the pixels 10 and is written on the pixels 10.

Only during an initial scanning period of one frame period, data of an input image is addressed to the pixels 10 and is written on the pixels 10. The pixels 10 are turned off in an off-level period of the EM signal EM. However, as shown in FIG. 10, the pixels 10 hold the data voltage and emit light during a turn-on period after a turn-off period at the same luminance as a turn-on period before the turn-off period.

An on-level period of the EM signal EM defines a turn-on period in the pixel array. The EM signal EM of the on-level forms the current path of the OLED in the pixels 10 and turns on the OLED. On the other hand, the off-level period of the EM signal EM defines a turn-off period in the pixel array. During the turn-off period, the EM signal EM of the off-level is applied to the pixels 10. The pixels 10 of the turn-off period display a black gray level because the current path of the OLED is blocked and the current does not flow in the OLED.

The EM signal EM has two or more cycles during the duty driving period tem of one frame period. One cycle of the EM signal EM includes one on-level period and one off-level period. Thus, the on-level periods and the off-level periods of the EM signal EM alternate with each other during the duty driving period tem, and the adjacent on-level periods are cut off with the off-level period interposed therebetween. Each pixel 10 is turned off due to the EM signal EM one or more times in the duty driving period tem. Because the off-level period of the EM signal EM is shifted along a scanning direction of the display panel, the turn-off period in the pixel array AA is shifted along the off-level period of the EM signal EM as shown in FIG. 11. In other words, not all of the EM signals are driven in the same phase. Some EM signals are out of phase with each other. For example EM signal EM1 has a different phase than EM signal EMn. This causes light emission of different pixel rows to be switched on and off at different phases.

The duty driving method drives the pixels 10 at a duty ratio equal to or less than 50% and thus can improve the image retention and the flicker. The duty ratio refers to the ratio of the on time of a pixel to the combined on and off time of the pixel. In particular, the duty driving method can reduce the user's fatigue when the personal immersive device displays the 3D motion picture.

The embodiment of the invention holds the data voltage of the pixels during the duty driving period without additionally writing data on the pixels. This is described with reference to FIG. 13.

Referring to FIG. 13, after data is written on the pixels 10 through the data addressing, the first scan pulse SCAN1 maintains the off-level during one frame period. As a result, after the storage capacitor Cst is charged with the data voltage, the first node A connected to the gate of the first TFT T1 is floated. When a source voltage Vs of the first TFT T1 changes, the gate voltage Vg changes depending on a change in the source voltage Vs while charges of the storage capacitor Cst are uniformly maintained. As a result, after the pixels 10 are turned off due to the on-level period and the off-level period of the EM signal EM, the gate-to-source voltage Vgs of the driving element, i.e., the first TFT T1 may be uniformly held even if data is not again written on the pixels 10. Because the gate-to-source voltage Vgs of the driving element T1 is uniformly held as described above, the data written on the pixels 10 is maintained.

As described above, the embodiment of the invention can improve the stereoscopic feeling and the immersion in the personal immersive device by optimizing the panel structure, the resolution, the response characteristics, the driving method, etc. of the display device, and also can reduce the user's fatigue.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A virtual reality display device, comprising:
    a first pixel array of the virtual reality display device,
    wherein pixels of the first pixel array have a response time that is less than 2 msec, and wherein the first pixel array has a resolution equal to or greater than 1440×1280, a pixel density equal to or greater than 500 ppi (pixels per inch), and a pixel aperture ratio equal to or greater than 14%, and
    wherein the pixels comprise a first pixel coupled to a first emission line, a second pixel coupled to a second emission line and a second scan line, and a first scan line, and further comprising:
    a driver circuit to:
        provide, during a scanning period set to one horizontal period and including an initialization period, a sampling period and a programming period, a first scan signal to the first scan line at a first voltage level to address data to the first pixel, wherein the first scan signal is provided to the first scan line at the first voltage level continuously during the scanning period;
        provide, during the programming period of the scanning period, a first emission signal at a voltage level to switch off light emission of the first pixel to the first emission line;
        provide, during a duty driving period following the scanning period, and while the first scan signal is at a second voltage level, the first emission signal having a duty ratio that is less than or equal to 50% to the first emission line, light emission of the first pixel being at least twice repeatedly switched on and off based on a state of the first emission signal; and
        provide, during the duty driving period, a second emission signal to the second emission line having a duty ratio that is less than or equal to 50% and having a different phase than the first emission signal, light emission of the second pixel being at least twice repeatedly switched on and off based on a state of the second emission signal.

2. The virtual reality display device of claim 1, wherein the pixels of the first pixel array comprise metal oxide semiconductor field effect transistors (MOSFETs).

3. The virtual reality display device of claim 1, further comprising:
    a second pixel array separated from the first pixel array by a gap,
    wherein a distance from a center of the first pixel array to a center of the second pixel array is between 58 mm to 72 mm.

4. The virtual reality display device of claim 1, further comprising:
    a second pixel array separated from the first pixel array by a gap,
    wherein the first pixel array is adjacent to the second pixel array along a first direction,
    wherein the first pixel array has a landscape aspect ratio such that a length of the first pixel array in the first direction is longer than a length of the first pixel array in a second direction perpendicular to the first direction, and
    wherein the second pixel array has a landscape aspect ratio such that a length of the second pixel array in the first direction is longer than a length of the second pixel array in the second direction.

5. The virtual reality display device of claim 1, further comprising:
    a second pixel array separated from the first pixel array by a gap,
    a first data driver IC to provide data voltages to first data lines coupled to the first pixel array;
    a second data driver IC to provide data voltages to second data lines coupled to the second pixel array.

6. The virtual reality display device of claim 5, further comprising:
    a first gate driver to provide scan signals to first gate lines coupled to the first pixel array;
    a second gate driver to provide scan signals to second gate lines coupled to the second pixel array,
    the first gate driver and the second gate driver located between the first pixel array and the second pixel array.

7. The virtual reality display device of claim 1, wherein the first pixel comprises:
    a light emitting element to emit light in accordance with current flowing through the light emitting element;
    a storage capacitor;
    a scan transistor to supply a data voltage to the storage capacitor, the scan transistor having a gate connected to the first scan line;

a drive transistor to control a level of the current flowing through the light emitting element in accordance with the data voltage; and a switching transistor to switch a first current on and off in response to the state of the first emission signal.

8. The virtual reality display device of claim 1, wherein the driver circuit is to:

provide, during the scanning period, a second scan signal to the second scan line at the first voltage level to address data to the second pixel; and provide, during the duty driving period and while the second scan signal is at the second voltage level, the second emission signal to the second emission line.

9. A virtual reality display device, comprising:

a first pixel array; and a second pixel array separated from the first pixel array by a gap, wherein a distance from a center of the first pixel array to a center of the second pixel array is between 58 mm to 72 mm, wherein the first pixel array and the second pixel array each have a resolution equal to or greater than 1440× 1280, a pixel density equal to or greater than 500 ppi (pixels per inch), and a pixel aperture ratio equal to or greater than 14%, and wherein the first pixel array comprises a first pixel coupled to a first emission line and a first scan line, a second pixel coupled to a second emission line and a second scan line, and further comprising:

a driver circuit to:

provide, during a scanning period set to one horizontal period and including an initialization period, a sampling period and a programming period, a first scan signal to the first scan line at a first voltage level to address data to the first pixel, wherein the first scan signal is provided to the first scan line at the first voltage level continuously during the scanning period;

provide, during the programming period of the scanning period, a first emission signal at a voltage level to switch off light emission of the first pixel to the first emission line;

provide, during a duty driving period following the scanning period, and while the first scan signal is at a second voltage level, the first emission signal having a duty ratio that is less than or equal to 50% to the first emission line, light emission of the first pixel being at least twice repeatedly switched on and off based on a state of the first emission signal; and provide, during the duty driving period, a second emission signal to the second emission line having a duty ratio that is less than or equal to 50% and having a different phase than the first emission signal, light emission of the second pixel being at least twice repeatedly switched on and off based on a state of the second emission signal.

10. The virtual reality display device of claim 9, wherein pixels of the first pixel array and the second pixel array have a response time that is less than 2 msec, the response time for a pixel being a sum of a first amount of time for brightness of the pixel to rise from 10% of white luminance to 90% of white luminance and a second amount of time for response time to fall from 90% of white luminance to 10% of white luminance.

11. The virtual reality display device of claim 9, wherein pixels of the first pixel array and the second pixel array comprise metal oxide semiconductor field effect transistors (MOSFET).

12. The virtual reality display device of claim 9, wherein the first pixel array is adjacent to the second pixel array along a first direction, wherein the first pixel array has a landscape aspect ratio such that a length of the first pixel array in the first direction is longer than a length of the first pixel array in a second direction perpendicular to the first direction, and wherein the second pixel array has a landscape aspect ratio such that a length of the second pixel array in the first direction is longer than a length of the second pixel array in the second direction.

13. The virtual reality display device of claim 9, further comprising:

a first data driver IC to provide data voltages to first data lines coupled to the first pixel array; and a second data driver IC to provide data voltages to second data lines coupled to the second pixel array.

14. The virtual reality display device of claim 13, further comprising:

a first gate driver to provide scan signals to first gate lines coupled to the first pixel array;

a second gate driver to provide scan signals to second gate lines coupled to the second pixel array, the first gate driver and the second gate driver located between the first pixel array and the second pixel array.

15. The virtual reality display device of claim 9, wherein the first pixel comprises:

a light emitting element to emit light in accordance with current flowing through the light emitting element;

a storage capacitor;

a scan transistor to pass a data voltage to the storage capacitor, the scan transistor having a gate connected to the first scan line;

a drive transistor to control a level of the current flowing through the light emitting element in accordance with the data voltage; and a switching transistor to switch a first current on and off in response to the state of the first emission signal.

16. The virtual reality display device of claim 9, wherein the driver circuit is to:

provide, during the scanning period, a second scan signal to the second scan line at the first voltage level to address data to the second pixel; and provide, during the duty driving period and while the second scan signal is at the second voltage level, the second emission signal to the second emission line.

* * * * *